United States Patent [19]

Pelkey

[11] Patent Number: 5,391,209
[45] Date of Patent: * Feb. 21, 1995

[54] METHOD FOR CONTROLLING OVERPRESSURIZATION IN A GAS LINE

[75] Inventor: Mark J. Pelkey, Clarence, N.Y.

[73] Assignee: Leidy Hub, Inc., Buffalo, N.Y.

[*] Notice: The portion of the term of this patent subsequent to Mar. 5, 2008 has been disclaimed.

[21] Appl. No.: 980,472

[22] Filed: Nov. 23, 1992

Related U.S. Application Data

[63] Continuation-in-part of Ser. No. 626,634, Dec. 12, 1990, abandoned, which is a continuation-in-part of Ser. No. 538,912, Jun. 15, 1990, Pat. No. 4,997,459, and a continuation-in-part of Ser. No. 538,913, Jun. 15, 1990, Pat. No. 5,000,214.

[51] Int. Cl.⁶ .............................................. F17D 1/04
[52] U.S. Cl. ..................................... 48/191; 48/192; 137/14
[58] Field of Search ................... 48/191, 192, 173; 137/115, 489, 492, 492.5, 14, 24; 201/24

[56] References Cited

U.S. PATENT DOCUMENTS

| | | | |
|---|---|---|---|
| 2,631,931 | 3/1953 | Skaeffy et al. | 48/191 |
| 2,707,970 | 5/1955 | Hughes | 137/489 |
| 2,969,805 | 1/1961 | Hunter | 137/489 |
| 3,023,093 | 2/1962 | Hughes | 48/191 |
| 3,075,544 | 1/1963 | Heidman | 137/489 |
| 3,669,143 | 6/1972 | Reese | 137/489 |
| 4,253,484 | 3/1981 | Danez | 137/489 |
| 4,367,767 | 1/1983 | Hund | 137/492.5 |
| 4,622,999 | 11/1986 | Ray | 251/29 |
| 4,994,249 | 7/1990 | Takeuchi et al. | 137/489 |
| 4,997,459 | 3/1991 | Pelkey | 48/191 |
| 5,000,214 | 3/1991 | Pelkey | 137/14 |
| 5,063,956 | 11/1991 | Borach et al. | 137/14 |

Primary Examiner—Peter Kratz
Attorney, Agent, or Firm—James J. Ralabate

[57] ABSTRACT

The invention relates to a gas pressure safety device used in the natural gas distribution systems leading to homes or other customers. This safety device is connected to a gas venting device that allows excess gas to exit therefrom. The safety device is made up of a needle valve, a pressure sensing pilot and a spring-diaphragm actuator. The needle valve is used to restrict the rate of gas flow into the actuator to a rate less than that that can be vented by the pressure sensing pilot. When an excess pressure is generated in the distribution system, the pressure sensing pilot senses when to exhaust the excess gas through the actuator and out of the gas venting device to the atmosphere.

2 Claims, 2 Drawing Sheets

Fig. 2

½ PSIG

Fig. 3

⅔ PSIG

METHOD FOR CONTROLLING OVERPRESSURIZATION IN A GAS LINE

This application is a continuation in part of application Ser. No. 07/626,634, filed Dec. 12, 1990, now abandoned, which application is a continuation in part of application Ser. No. 07/538,912, filed Jun. 15, 1990, now U.S. Pat. No. 4,997,459, and a continuation in part of application Ser. No. 07/538,913, filed Jun. 15, 1990, now U.S. Pat. No. 5,000,214.

This invention relates to a novel device and method for providing a safeguard against overpressurization in a gas distribution system. More particularly, this invention relates to a gas pressure safety unit or device that can easily be connected to a main gas line in a gas distribution system.

BACKGROUND OF THE INVENTION

Parent application Ser. No. 07/538,912 discloses a gas distribution system which has a main gas line in gas flow connection with several components including a gas pressure safety structure. A pressure regulator is located on a front or forward portion of the main gas line and reduces the gas pressure at a point in the main gas line subsequent to the pressure regulator. There is an auxiliary gas line that extends from a point on the main line before the gas pressure regulator to the gas pressure safety structure. The gas presssure safety structure has in gas flow connection a source pressure regulator, an inspirator and a pressure sensing pilot all in gas flow connection with a gas venting means. Upon overpressurization the pressure sensing pilot will be activated and the inspirator will cause a vacuum to be formed in its connection with the gas venting means. This vacuum will open the gas venting means to permit the excess gas to be vented to the atmosphere. The system of the present invention is similar to the system of parent application Ser. No. 07/538,912 except an inspirator is not required in the present system. Other means are used and disclosed herein in place of the inspirator of this present case.

In parent application Ser. No. 07/538,913 a safety device is disclosed made up of a source pressure regulator, an inspirator and a pressure sensing pilot connected to a gas venting means. All of these components are in gas flow connection with each other. The pressure sensing pilot has a valve that will open upon overpressurization of the gas transport system containing these components. Upon this overpressurization the inspirator will cause a vacuum to be formed which will open or activate the gas venting means and permit the excess gas to be vented to the atmosphere. As noted earlier, the venting of gas in the present invention is not affected by the use of an inspirator as required in parent application Ser. No. 07/538,913.

When natural gas is distributed to customers, gas distribution companies generally provide a main having the pressure of the gas at about 20 to 60 pounds per square inch (PSIG). Since most home appliances are programmed to operate under gas pressures of about ½ PSIG, the gas pressure directed from the main gas line to each home must be reduced to this lower pressure, i.e. ½ PSIG. To accomplish this, pressure regulators are placed in the gas line to reduce the gas pressure from about 20 to 60 PSIG to ½ PSIG to make it suitable for customer use. These pressure regulators are either located at the service entrance for each individual customer or in a district regulator station that serves a number of customers. To protect against overpressurization of the gas supplied to customers because of regulator failure, a safety device is required downstream of the pressure regulator. This safety device is located between the customers' gas lines and the pressure regulator. These safety devices can be installed to act at either individual service regulators or at district pressure regulators. Individual service regulators are equipped with internal relief valves which automatically vent any excess gas (beyond about ½ PSIG) to the atmosphere. The internal relief valves used are simple, reliable spring-operated devices similar in design to the pressure relief valve located on hot water tanks.

District pressure regulators on the other hand are usually larger than individual service regulators. There are a number of different devices that have been used to provide overpressure protection. These include safety shut off valves, monitor regulators and relief valves and all are generally located downstream of the district pressure regulator. The safety shut off valve will shut off gas flow in the event of a regulator failure and therefore are impractical since their use requires relighting every customer's appliances. The monitor regulator's function is to take over the pressure reduction failure. the monitor regulators have substantially the same mechanical structure as district pressure regulators. A problem with the use of monitor regulators is that they suffer from the same failure cause as the district pressure regulator. Thus, dirt or other debris passing through the piping system is likely to have the same adverse effect on both the district pressure regulator and the monitor regulator. This can result in the failure of both devices and subsequent overpressurization of the downstream system.

Relief valves are provided to sense the downstream pressure in a piping system and are designed to open when the pressure exceeds a predetermined setpoint. In a stable and normal operating mode these relief valves are in a closed position and no gas flows through them. Upon overpressurization the relief valve opens and excess gas is vented to the atmosphere. It is common to install relief valves with a setpoint of ⅝ PSIG, and when the district pressure regulator fails to keep the pressure below this ⅝ PSIG setpoint, the relief valve opens to vent the gas. Every district pressure regulator has an associated maximum capacity. Given a maximum inlet pressure, it is possible to calculate the peak gas volume that can pass through a district pressure regulator. The relief valve associated with a district pressure regulator must have a greater capacity than the regulator. As long as this size relationship is maintained, the relief valve will have the ability to vent all of the excess gas that the district pressure regulator is capable of allowing into the system. For this reason relief valves generally have a greater diameter than their associated regulators. It is common to install a four or six inch diameter relief valve downstream of two inch diameter regulator. The use of a relief valve as the safety device in this type system appears to be the most practical of the prior art devices. The present invention relates to a system and a safety device utilizing a novel pressure relief valve configuration.

There are three basic types of relief valves, liquid sealed, self operated and pilot operated. In each case, in a stable system, gas is restrained by a mechanical sealing mechanism. Liquid sealed relief devices are the simplest of the three. A large tank of liquid, usually an oil similar to motor oil, is placed near the piping system downstream of a district pressure regulator. A branch line from the downstream system is run to the top of the tank. The branch line is turned downward with the open end of the line ending below the surface of the liquid. As long as the head pressure of the liquid is greater than the gas pressure in the line, the system stays sealed. If the gas pressure exceeds the head pressure of the liquid, it forces the liquid out of the tank and allows the gas to flow to the atmosphere. Setpoint can be controlled by varying the level of the liquid in the tank. Liquid seal relief devices are very messy. They are not appropriate in an environmentally conscious society. They also have the disadvantage that they will not reseal themselves if system pressures return to normal. They will continue to allow gas to flow to the atmosphere until someone refills them with the liquid.

In self-operated relief valves a plug and orifice combination is common. They are configured much the same as a standard water faucet with the water sealed behind the orifice by a rubber plug. However, instead of forcing the plug into place with a threaded, manually operated stem, a series of weights or a spring holds the plug down. By carefully controlling the amount of weight or spring compression holding the plug into place, it is possible to design a device to open at any desired internal system pressure. Self-operated relief valves open when the pressure per square inch acting upward on the area on the bottom of the plub exceeds the down force generated by the weights or spring compression attempting to hold the plug down. Self-operated relief valves do have the advantage that they will reseal themselves once system pressures return to normal.

Self-operated relief valves have an inherent problem called build up. There is a relationship between setpoint, the volume of gas that needs to be vented and the amount of plug movement required to vent that gas. When the system pressure is equal to setpoint, a state of equilibrium exists. A slight increase in system pressure results in a slight upward movement of the relief valve's plug. It follows that a significant movement of the valve plug requires a significant increase in system pressure. This increase is called build up. It is common to design a self-operated relief valve to have a setpoint of ⅜ PSIG and allow a build up to 2 PSIG before the desired maximum capacity is achieved.

Conventional prior art pilot operated relief valves use gas pressure to hold the sealing mechanism in place. The piping system being protected has traditionally been the source of this pressure. The down force required to keep these valves closed had been generated by designing a valve where the underside of the plug had a smaller area than the upper side. The introduction of the same pressure per square inch to both sides of such a plug results in a net down force proportional to the difference in the two surface areas. This same basic relationship has been used regardless of the sealing mechanism. This difference in surface areas approach has been used to operate sleeve type and piston type valves.

In high pressure applications a slight difference in surface areas results in a significant net sealing force. In low pressure applications a much larger difference in surface areas is required to achieve an acceptable net sealing force. This has led low pressure relief valve designers to use complex and expensive castings to create functional pilot operated relief valves.

There are several known systems for conveying and supplying natural gas. There are also, as noted earlier, alternate means for controlling overpressurization of the gas along the supply lines. In U.S. Pat. No. 323,840 (Westinghouse I) a method of conveying gas is disclosed wherein a low gas pressure is maintained in the pipelines to reduce the tendency of leakage or rupture of the pipes. Westinghouse I does not address the problem of automatically controlling overpressurization with a safety device such as a pilot operated relief valve that operates in cooperation with a spring-diaphragm actuator. Westinghouse I is more concerned with conveying gas by exhaustion from one to another section of a conducting main in which an average pressure below that of the atmosphere is maintained. In U.S. Pat. No. 328,368 (Westinghouse II) a process for reducing pressure by an exhausting device such as a reciprocating or rotary pump or blower is disclosed. This exhausting device is driven by steam, compressed air or high pressure gas. The gas is conveyed in pipes or a jet apparatus activated by high pressure gas located adjacent to the delivery end of each of separate compartments. The exhausted gas is forced through a pipe into the receiving end of the next succeeding compartment thus effecting a reduction in pressure. In U.S. Pat. No. 4,622,999 (Ray) a gas flow control system which utilizes a pilot control of the main gas valves and a boosted gas pressure as the motive fluid is disclosed. Ray's system comprises a main diaphragm control valve, a second similar valve which is a diaphragm operated shut off valve and a third diaphragm valve which is in a vent line connected to the line between the other two valves. A booster pump is provided in Ray's system which draws on the incoming gas itself and boosts its pressure so that its discharge pressure can be used for operation of the valves and all of the other components of the system. Ray's system does not utilize high pressure gas from the upstream side of a district pressure regulator as a power source. He usees an electrically operated booster pump to elevate system pressures to his required levels.

The present invention provides a gas pressure safety device that can be connected to a gas distribution network to automatically protect against overpressurization in this gas distribution network.

SUMMARY OF THE INVENTION

It is therefore an object of this invention to provide a novel gas pressure safety system devoid of the above-noted disadvantages.

An object of this invention is to provide a novel safety device that can be easily connected to existing main gas lines in gas distribution systems.

Another object of this invention is to provide a novel pressure relief system and apparatus that is relatively inexpensive yet very effective.

Still another object of this invention is to provide a novel pressure relief safety system and apparatus that can be installed in most gas distribution networks.

Still a further object of this invention is to provide a safety device to protect downstream gas networks or systems from overpressurization.

Still yet a further object of this invention is to provide a safety valved device where the system pressure is not required to perate the valve therefore avoiding pressure build up concerns, such as occurs in a spring or weight operated relief valve.

Yet another object of this invention is to provide a novel pressure relief safety system utilizing a relief valve and a spring-diaphragm actuator.

Yet still a further object of this invention is to provide a gas pressure safety system that utilizes gas pressure brought from the upstream side of a district pressure regulator.

Yet still another object of this invention is to provide a novel system wherein excess gas is vented to the atmosphere during system pressure problem situations and wherein the system automatically returns to normal upon a normalization of system gas pressure.

These and other objects which will become apparent upon a further reading of this disclosure are accomplished by providing a novel relief valve structure and system containing at least three principal components:
A. at least one spring-diaphragm actuator;
B. at least one pressure sensing pilot; and
C. at least one needle valve.

These three components are in gas flow connection and/or mechanical connection to a gas venting means such as a globe valve.

The gas pressure safety device of this invention can easily be connected to a main gas line and is adapted for use in a gas distribution network. This safety device in one embodiment comprises serially connected along a gas conduit and in gas flow connection, a gas venting means, means to open and close said gas venting means, a pressure sensing means and means for connecting said gas pressure safety device in gas flow connection to said gas distribution network. The presssure sensing means has a pressure setpoint at which it will be activated, and this pressure sensing means has means for sensing when said setpoint is reached. The means to open and close said gas venting means is in gas flow connection along a gas line with said pressure sensing means and has means to open said gas venting means upon activation of said pressure sensing means.

The principal functions of each components in this gas pressure safety device are:

A. Spring-diaphragm actuator. A two-chambered device, mechanically connected to a globe valve. It has as its primary function the opening and closing of a gas venting means. The chambers are separated by a flexible diaphragm. One side is designed to accept gas pressure, the other side contains a spring. The introduction and exhaustion of gas pressure into the first chamber results in compression and then relaxation Of the spring in the second chamber as the diaphragm moves back and forth. This results in the required movement of the mechanically connected globe valve.

B. Pressure sensing pilot. Used to determine when it is appropriate for the gas venting means to open as it senses excess gas pressure in the piping system; and C. Needle valve. Used to restrict the maximum rate of gas flow into the top chamber of the valve actuator to a rate less then that that can be vented by the pressure sensing pilot. This results in the pilot having control over the pressure that is present in the actuator's upper chamber.

The globe valve to which the novel gas pressure safety device of this invention is connected can be any suitable gas pressure relief valve such as the Design ET control valve manufactured by the Fisher Controls Corp. of Marshalltown, Iowa. This valve vents excess gas from the low pressure distribution system to atmosphere during the failure of an associated district pressure regulator.

The internal sealing mechanism consists of a metal plug that has the ability to seal against a seat in the valve body. The movement of this plug is controlled by an attached metal stem that runs from the plug, out through the top of the valve body to the spring-diaphragm actuator. The valve is configured such that compressive, or down, force on the stem closes it. Tensile, or up, force opens the valve.

The spring-diaphragm actuator can be any suitable actuator such as the Type 657 valve actuator manufactured by the Fisher Controls Corp. of Marshalltown, Iowa. The actuator consists of a two chambered vessel attached to a mounting bracket. A flexible diaphragm separates the upper and lower chambers. The upper chamber is designed such that the introduction of a gas at a suitable pressure results in the downward movement of the diaphragm. The lower chamber contains a spring that compresses between the diaphragm and the mounting bracket as the diaphragm moves downward. When the pressure in the upper chamber is below a designed value, the spring force pushes the diaphragm upward.

A stem is attached to the diaphragm. The bottom of the actuator stem is designed to be connected to the top of the valve stem. This allows the motion of the diaphragm to be transmitted to the valve plug. In this way an attached control system can open and close the valve as necessary by introducing gas into or venting gas from the upper chamber of the spring-diaphragm actuator.

When the system is in a stable condition, and there is no flow through the pilot, the system equalizes with an internal pressure equal to the pressure upstream of the district pressure regulator. This system pressure is also transmitted to the chamber above the actuator's diaphragm. The relief valve then stays closed. The pressure sensing pilot used was obtained from Fisher Controls Co. identified as Model Y611 however any suitable pressure sensing pilot may be used. This pilot is the "brains" of the present system. It determines when it is necessary to open the relief valve. The pilot monitors the pressure in the low pressure distribution system. Under stable operating conditions it stays closed. It opens whenever the system pressure rises above setpoint, allowing the gas above the actuator's diaphragm to escape, thereby effecting the opening of the relief valve.

Generally, the pressure safety system of the present invention operates as follows. A main gas supply line conveying gas under pressure of about 20–60 PSIG is extended to a district pressure regulator. The invention will be described throughout wherein the gas in the main gas line is at about 30 PSIG, however it should be understood that any conventionally used pressure is intended such as 20–60 PSIG. The district pressure regulator converts the gas pressure from about 30 PSIG to about ¼ PSIG. The main gas line continues beyond the district pressure regulator and now carries gas at a pressure af about ¼ PSIG. This main gas line is in gas flow connection with the novel safety device of this invention which is on the main gas line downstream from the district pressure regulator. An auxiliary gas line is also extended from the mainline before the district pressure regulator to the safety device of this invention. It does not go through the district pressure regulator. An important feature of the present invention is the use of this auxiliary line to provide gas from the upstream side of the district pressure regulator as a power source as will be later described. This auxiliary line provides gas to the safety device of this invention at a pressure of about 30 PSIG. Thus, one inlet (the globe valve) of the safety device of this invention is receiving gas from downstream of the district pressure regulator at a gas pressure of about ¼ PSIG and one inlet (the needle valve) of the safety device of this invention is receiving gas via the auxiliary line from upstream of the district pressure regulator at a gas pressure of about 30 PSIG.

In a stable system, the gas received at the needle valve is allowed to flow at a low rate into the top chamber of the actuator. This gas pressure pushes the diaphragm, the actuator stem and valve stem and consequently the valve plug down. This results in a relief valve in the desired closed position. The relief system will not change from this condition until it senses a change in the distribution system that it is protecting. The pressure sensing pilot which senses the excess gas pressure in the system is also in a closed mode during normal pressure system conditions. The pressure sensing pilot has a set pressure sensitive gas closure means that will only open upon the pressure exceeding that set pressure. As noted earlier, the pressure sensing pilot is the brains of the gas pressure safety structure and system of the present invention. It will sense when the relief valve should be opened or remain closed. It opens whenever the pressure in the system exceeds the setpoint thereby permitting gas flow out of the upper chamber of the actuator at a higher rate than it can be replaced by gas flow into that chamber through the needle valve. This results in a reduction in the pressure in the chamber and a subsequent upward movement of the diaphragm. The relief valve then opens allowing the excess gas present in the distribution system to vent to the atmosphere.

The control system for the relief valve used in this invention consists of three parts: a needle valve, an actuator and a pilot. All three are in gas flow connection through a simple, unrestricted tee-shaped set of tubes. The needle valve sets a constant, low rate for flow into this tubing and through it into the control chamber of the actuator. The pilot decides when to exhaust the gas from this tubing and through it the control chamber of the actuator at a high rate.

An important feature of this invention is the use of gas from the upstream side of the district pressure regulator as a power source. This high pressure gas is available at about 30 PSIG. The low pressure system contains gas at about ¼ PSIG. Therefore, there is roughly 60 times more pushing power available from upstream gas than downstream gas.

The power gas pressure has a direct impact on the diameter of the diaphragm that is required to compress the actuator spring. The actuator spring size is determined by the amount of force required to open the attached relief valve. Valves with high internal mass or frictional forces require larger springs to open them. It follows that they also require larger diaphragm generated down forces to compress that spring and push them closed.

The down force generated by a diaphragm is a function of the diaphragm's area and the pressure applied to the top of it. Our system uses high pressure gas in order to minimize the required diaphragm area. This results in a lower cost system.

Spring-diaphragm actuators are available from manufacturers in a finite number of pressure ranges. In a case where the high pressure system pressure exceeded the pressure rating of the desired actuator, it would be possible to install a source pressure regulator in the auxiliary gas line (running from the upstream side of the district pressure regulator to the needle valve) to reduce that inlet gas pressure to the desired level. For example, if an actuator with a 30 PSIG pressure rating was desired for a system, and the upstream system ran at a higher pressure of 35 PSIG, a source pressure regulator could be used to reduce that inlet pressure from 35 PSIG to 30 PSIG.

BRIEF DESCRIPTION OF THE DRAWING

FIG. 2 is a schematic view of the gas pressure safety structure and system of the present invention in a normal stable mode.

FIG. 3 is a schematic view of the gas pressure safety structure and system of the present invention after the failure of the district pressure.

DESCRIPTION OF THE DRAWING AND PREFERRED EMBODIMENTS

Figure 1:
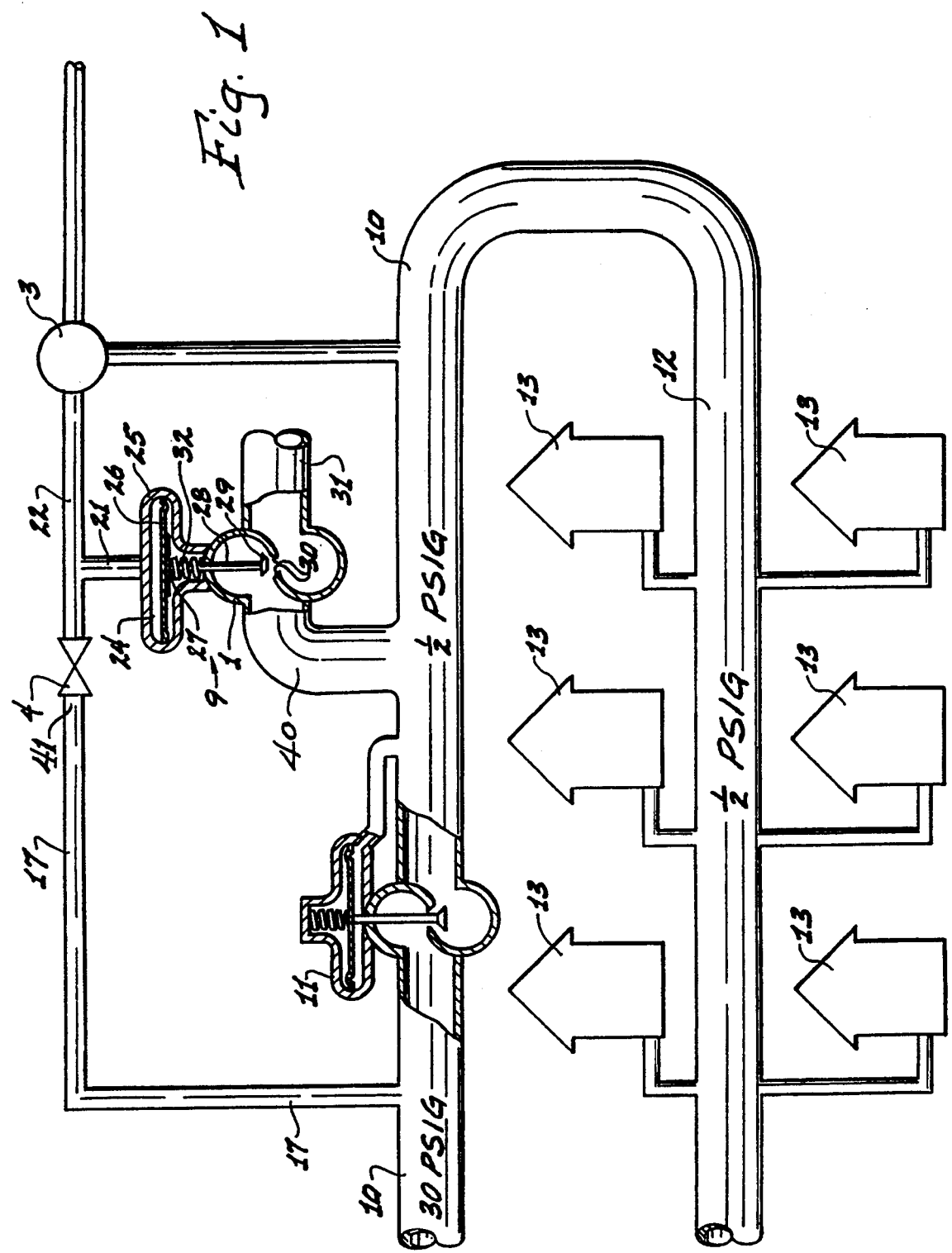
FIG. 1 is a schematic view of the natural gas distribution system including the present invention.

In FIG. 1 a gas distribution system is illustrated having main gas supply network or line 10 which conveys gas from a supply piping system to a district pressure regulator 11. The pressure in the main gas supply line is generally maintained at a pressure of from about 20 to 60 PSIG. This pressure will be referred to throughout this disclosure as "about 30 PSIG". At pressure regulator 11 the gas pressure is reduced from about 30 PSIG to about ¼ PSIG. Gas distribution companies use pressure to transport gas throughout their systems. Gas pressures as noted above of 20 to 60 PSIG are economical and efficient and therefore common in these type systems. However, the appliances found in most residential customers' homes are designed to operate at low pressure, usually around ¼ PSIG. Pressure regulator 11 is a device commonly used to reduce the gas pressure to ¼ PSG for transportation to the household. Pressure regulators like 11 require a safety device to protect the downstream system and customers from the danger of receiving high pressure gas in the event regulator 11 fails for any reason. After the gas in the system passes through district pressure regulator 11 and is reduced to ¼ PSIG it continues to the safety unit device 9 of this invention. This safety device 9 is in gas flow connection with gas venting means 1, 31 and 33. Gas means 1 can be any suitable gas exhaust or means that can be vent-opened by the action of a piston-pressure actuator, spring-pressure actuator or a spring-diaphragm actuator. In place of globe valve 1 shown in the drawings, the following typical gas venting means (or any suitable venting means) may be used in the present invention:

A. Piston Operated Butterfly Valve—such as the Type 8550 "edisc" Valve manufactured by the Fisher Controls Corporation of Marshalltown, Iowa as described in Bulletin 51.6:8550 dated May 1981, operated by a Robotarm Spring Return Valve Actuator manufactured by the Bettis Corporation of Houston, Tex. as described in catalog number 1008.

B. Piston Operated Plug Valve—Figure D-451 round port, full pipe area, cylindrical plug valve manufactured by Resun Manufacturing Company of Tomball, Tex. as described in Catalog P5-87 operated by a Robotarm Spring Return Valve Actuator manufactured by the Bettis Corporation of Houston, Tex. as described in catalog number 1008.

Figures 2, 3:
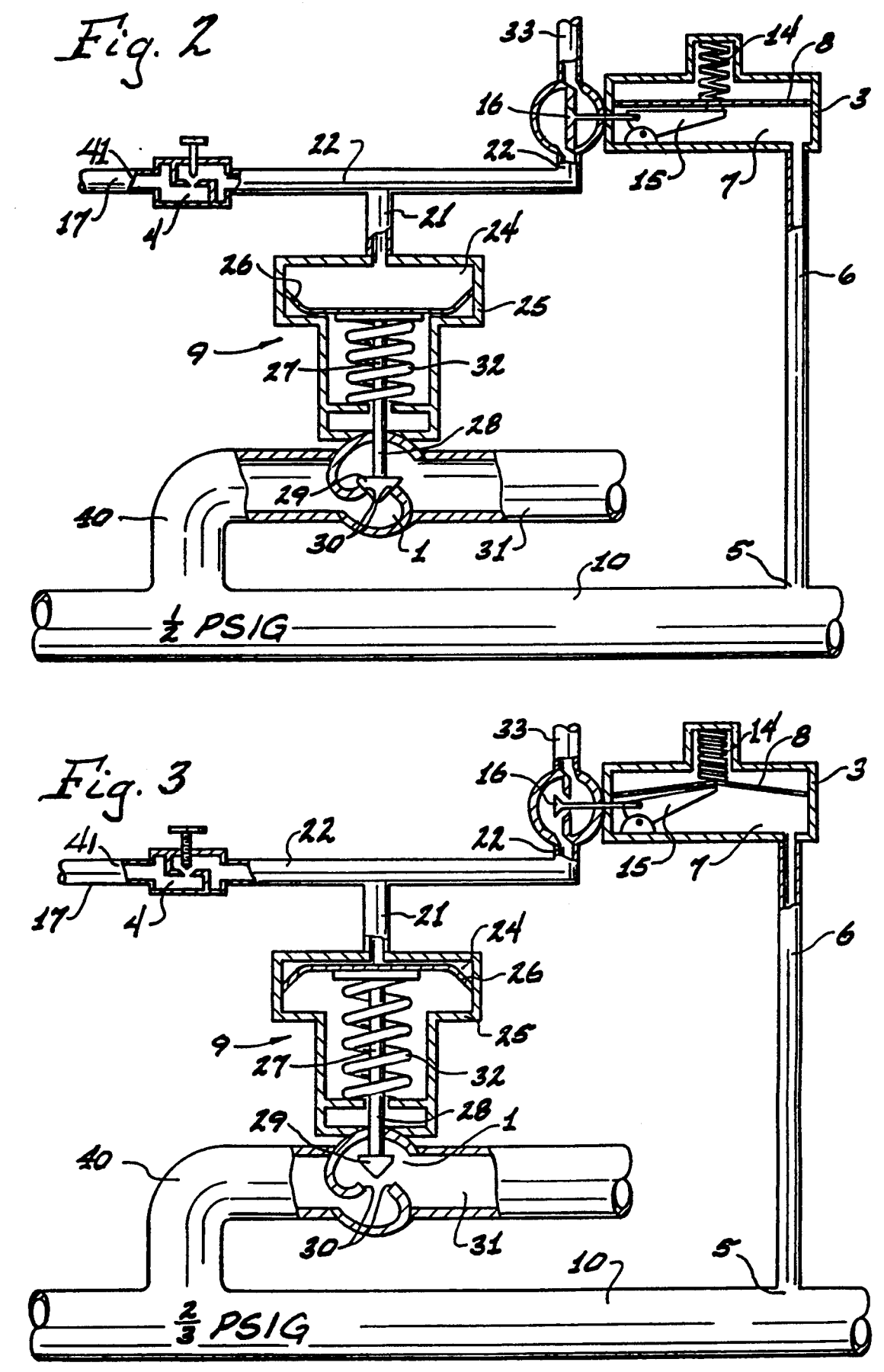

One suitable gas venting means is a globe valve 1 as shown in FIGS. 1–3. The gas transport or gas line 10 extends past the safety device 9 and in a stable situation feeds gas at about ½ PSIG to gas mains 12 on a residential street. Gas main 12 then conveys the gas to residential gas services or homes 13. An auxiliary gas line 17 extends from main gas line 10 at a point upstream from district pressure regulator 11 and connects on its opposite end 41 to needle valve 4. The needle valve 4 is used to restrict the maximum rate of gas flow into the top chamber 24 of the valve actuator 25 to a rate less than that that can be vented by the pressure sensing pilot 3. This results in pilot 3 having control over the pressure that is present in the actuator 25 upper chamber 24. An important feature of this invention is the use of a safety device comprising an auxiliary gas line 17 and a safety device 9 that is not totally dependent upon pressure downstream of the district pressure regulator. The auxiliary gas line 17 originates upstream of the district pressure regulator. This feature eliminates the problems associated with build up. The novel safety device 9 of this invention is connected to thee main gas line by elbow 40 as shown in FIGS. 1, 2 and 3. This connecting means 40 allows the novel safety device 9 to be in gas flow connection with main line 10. The safety device 9 is also in gas flow connection with main line 10 through auxiliary gas line 17 which extends from main gas line 10 at a point upstream from district pressure regulator 11 and connects on its opposite terminal end 41 to needle valve 4.

Given a stable distribution system of FIG. 1 and FIG. 2 with a system pressure of ½ PSIG, the globe valve 1 is in the closed position. The system pressure of ½ PSIG is transmitted through the tap 5 in the low pressure system, and the sense line 6, to the underside 7 of the pressure sensing pilot 3. This pressure acts against the diaphragm 8 with a pressure multiplied by area relationship creating a force upward. This force is resisted by a downward force created by a preset compression in spring 14. The ability to control the compression in this spring makes it possible to vary the pressure sensing pilot's 3 setpoint.

The diaphragm 8 stays flat as long as the spring 14 force downward exceeds the pressure force upward. This diaphragm position is transmitted through linkage 15 to valve 16. The internal geometry is structured such that this diaphragm position results in a closed valve.

Gas from the upstream side of district pressure regulator 11 at about 30 PSIG is allowed to flow through line 17 to needle valve 4. It is then allowed to flow through needle valve 4 at a low rate determined by the needle valve only being opened a small amount. This gas stream then flows through lines 21 and 22 into chamber 24 in valve actuator 25.

This 30 PSIG gas pressure pushes diaphragm 26 down. Diaphragm 26 in turn pushes down actuator stem 27, valve stem 28 and valve plug 29. Valve plug 29 seats against valve seat 30, thereby eliminating the ability of any ½ PSIG system gas to flow from downstream system 10 to the atmosphere through venting means or line 31. This process also results in the compression of spring 32.

This set of conditions represents a stable, closed system of FIG. 2. The relief system can stay in this position indefinitely, unless some event disrupts it. Most relief valves or gas venting means 1 stay in this position for their entire service lives.

The stability of this system is disrupted when the district pressure regulator fails as illustrated in FIG. 3. In a failed state, the district pressure regulator 11 (of FIG. 1) fails to keep the downstream system pressure below ⅝ PSIG. When the downstream system pressure builds in main line 10 beyond ⅝ PSIG, so does the pressure sensed by the pressure sensing pilot 3. When the upward force generated by the pressure in area 7 increases beyond the downward force generated by spring 14, diaphragm 8 moves up. This motion is translated by linkage 15 into the opening of valve 16.

As valve 16 opens, the gas in tubing 21, 22 and chamber 24 flows to the atmosphere through tube 33. Gas flows through line 17 and needle valve 4 at a low rate in an attempt to replace the vented gas. Due to needle valve 4's partially open position, it is unable to allow enough gas to flow towards chamber 24 to replace that vented through pilot 3. This results in a lower pressure existing in chamber 24 than exists in line 17.

As the pressure in chamber 24 drops, so does the down force that is present on diaphragm 26. At a specified point, the compression in spring 32 will exceed that down force. At that point, diaphragm 26 moves upward. Along with it, actuator stem 27, valve stem 28 and valve plug 29 also move upward. This movement creates an opening between valve plug 29 and valve seat 30. The excess gas in downstream system 10 is then allowed to flow through this opening and out to the atmosphere through gas venting means 31.

If another change in the system occurs resulting in the district pressure regulator 11 returning to normal, satisfactory operating conditions, this relief system will react and re-seal itself. If the pressure in the system drops below ⅝ PSIG, the pressure in the lower chamber 7 in the pressure sensing pilot 3 also drops below ⅝ PSIG. At that point the diaphragm 8 is forced down by spring 14. The linkage 15 translates that movement into the closure of valve 16. Gas continues to flow through needle valve 4 at a low rate until lines 21 and 22 and chamber 24 are filled with gas at a pressure equal to that in line 17, about 30 PSIG. This results in the downward movement of diaphragm 6, actuator stem 27, valve stem 28 and valve plug 29. When valve plug 29 reseats itself against valve seat 30, the flow of gas to the atmosphere is ended.

At this point the system will have again achieved a stable, closed position. The system will stay in this position until another event disrupts its stability.

Below are listed the components of the safety device in a preferred embodiment of the present invention.

(1) Design ET control valve manufactured by the Fisher Controls Corp. of Marshalltown, Iowa as described in Fisher Controls Corp. Bulletin 51.1:ET dated June 1989.

(2) Type 657 valve-actuator manufactured by the Fisher Controls Corporation of Marshalltown, Iowa as described in Fisher Controls Corporation Bulletin 61.1:657 dated March 1983.

(3) Pressure Sensing Pilot—Type Y610-21 and Y611 or Y600 Series manufactured by Fisher Controls Company located in Marshalltown, Iowa desscribed in Bulletins 71.3:Y610 January 1983 and in Bulletin 71.1:Y600 February 1987.

(4) H1 Hand Valve manufactured by Anderson, Greenwood & Company of Bellaire, Tex. described in Anderson, Greenwood & Company Bulletin 1-110-H1 dated August 1988.

A gas pressure safety device 9 can easily be connected to any main gas line or a gas distribution network such as network 10. The device 9 comprises connected in gas flow connection, a gas venting means 1 and 31, means 25 to open and close said gas venting means 1 and 31, a pressure sensing pilot or means 3 and connecting elbow means 40 and auxiliary line 17 for connecting said gas pressure safety device 9 in gas flow connection to said gas distribution network 10. The pressure sensing means 3 has a pressure setpoint at which it will be activated, and pressure sensing pilot or means 3 has means 6 for sensing when said setpoint is reached. There is a valve actuator or means 25 to open and close said gas venting means 1 and 31 for venting the excess gas to the atmosphere upon activation of said pressure sensing pilot or device 3. Although elbow means 40 is used to connect the gas pressure safety device 9 to a gas line 10 or gas network 10, any suitable connecting means may be used.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. A method for controlling overpressurization in a main gas line system which comprises a main gas line with a district pressure regulator therein, and an auxiliary gas line and a pressure safety device, each connected to the main gas line said pressure safety device comprising in gas flow connection a first normally closed gas venting means, a needle valve, a spring-diaphragm actuator and a pressure sensing pilot means, connecting said auxiliary gas line to the main gas line, and extending said auxiliary gas line in gas flow connection from a point upstream of said district pressure regulator to said needle valve, connecting in gas flow connection said needle valve said pressure sensing pilot means and said spring-diaphragm actuator, providing in said pressure sensing pilot means to detect any increase in pressure in said main gas line downstream of said district pressure regulator over a predetermined gas pressure and to use this increase in pressure to open a second normally closed gas venting means connected to said pressure sensing pilot means, and to thereby cause the venting of pressure in said spring-diaphragm actuator to atmosphere through said second normally closed gas venting means at a rate greater than said needle valve will allow replenishment of said spring-diaphragm actuator, and thereby providing a reduction in pressure in said spring-diaphragm actuator thereby allowing the spring in said spring-diaphragm actuator to force said first normally closed gas venting means to open, thereby allowing excess gas to be vented from the main gas line downstream of said district pressure regulator to the atmosphere, thereby reducing the gas pressure in said main gas line downstream of said district pressure regulator.

2. The method of claim 1 wherein said spring-diaphragm actuator has spring compressive force in mechanical connection to said gas venting means.

* * * * *